United States Patent [19]

Brachthäuser et al.

[11] 4,249,892
[45] Feb. 10, 1981

[54] METHOD AND APPARATUS FOR THE THERMAL TREATMENT OF PULVERULENT MATERIAL PARTICULARLY FOR THE CALCINING OF CEMENT

[75] Inventors: Kunibert Brachthäuser, Bensberg; Hubert Ramesohl, Bensberg-Refrath; Horst Herchenbach, Troisdorf, all of Fed. Rep. of Germany

[73] Assignee: Klöckner-Humboldt-Deutz AG, Fed. Rep. of Germany

[21] Appl. No.: 37,731

[22] Filed: May 10, 1979

Related U.S. Application Data

[63] Continuation of Ser. No. 752,910, Dec. 21, 1976, abandoned.

[30] Foreign Application Priority Data

Dec. 24, 1975 [DE] Fed. Rep. of Germany ....... 2558506

[51] Int. Cl.³ ............................................. F27B 15/00
[52] U.S. Cl. ...................................... 432/14; 432/15; 432/58; 106/100
[58] Field of Search .................... 106/100; 432/14, 15, 432/58, 106

[56] References Cited

U.S. PATENT DOCUMENTS

| | | | |
|---|---|---|---|
| 3,932,116 | 1/1976 | Hansen | 432/14 |
| 4,002,420 | 1/1977 | Christiansen | 432/14 |
| 4,035,139 | 7/1977 | Goldmann et al. | 432/106 |
| 4,066,470 | 1/1978 | Brachthäuser et al. | 106/100 |

OTHER PUBLICATIONS

Cement Data Book–International Process Engrg. in the Cement Industry–Macdonald & Evans, London, 1976, p. 384.

Primary Examiner—Larry I. Schwartz
Attorney, Agent, or Firm—Hill, Van Santen, Steadman, Chiara & Simpson

[57] ABSTRACT

Method and apparatus for the thermal treatment of pulverulent material in which the material is preheated and finely calcined in a calcination zone, the improvement involving pre-calcining the pulverulent material in a highly turbulent gaseous stream containing combustible fuel in a pre-calcination zone prior to final calcination.

4 Claims, 1 Drawing Figure

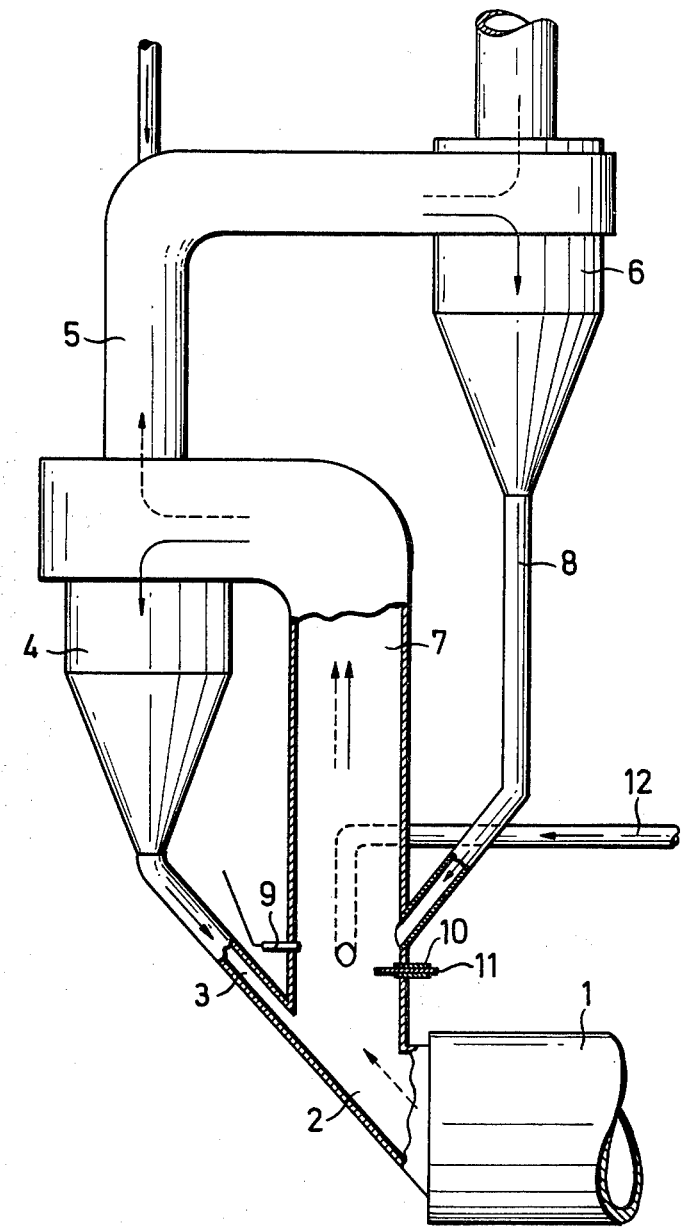

METHOD AND APPARATUS FOR THE THERMAL TREATMENT OF PULVERULENT MATERIAL PARTICULARLY FOR THE CALCINING OF CEMENT

This is a continuation of application Ser. No. 752,910, filed Dec. 21, 1976 now abandoned.

REFERENCE TO RELATED APPLICATION

This application has subject matter in common with a co-pending Brachthäuser et al., U.S. Ser. No. 665,327 filed Mar. 9, 1976 now U.S. Pat. No. 4,066,470 and assigned to the same assignee as the present application.

BACKGROUND OF THE INVENTION

1. Field of the Invention

This invention is in the field of thermal treatment of pulverulent material involving both a pre-calcining and a calcining zone, the pre-calcining being carried out in a highly turbulent gaseous atmosphere derived from the calcining zone, and including combustible fuel and preferably added oxygen containing gas, the gaseous atmosphere thus created passing through the pre-calcining zone at a very substantial linear velocity.

2. Description of the Prior Art

In the production of cement, argillaceous earth, lime, dolomite or the like, the heat treatment of the finely granular pulverized raw material is required. Typically, the prepared pulverized material is first delivered to a preheater section where it is suspended in a heat exchanger consisting of several cyclone separators connected in series and superimposed. Particles of the raw material are thereby preheated by the hot exhaust gases of a rotary kiln, the gases acting in countercurrent relationship to the pulverized material in the cyclone separators. Such thermal treatment provides deacidification of the pulverized material to a predetermined degree, before the particles are charged into the rotary kiln where they are calcined to completion. In this conventional method, almost the entire thermal energy is supplied to the rotary kiln, and a non-uniform distribution of heat occurs in the rotary kiln. The thermal degree of effectiveness and the output capacity of the furnace are limited and the life of the refractory bricks in the combustion zone is substantially reduced. In order to provide rotary kilns with a smaller cross-section and/or a furnace length, it has been attempted to undertake a low temperature calcination process of the pulverized raw material in a pre-combustion zone between the pre-heater and the furnace. For such a system to be effective, there must be an intimate mixture of fuel and raw material in the pre-combustion zone so that for the calcination of the pulverized raw material, the heat of the fuel may be imparted to the individual particles of the pulverized raw material.

In German Laid Open Specification No. 2,361,427 there is described a pre-combustion zone which is constructed in the nature of a shaft and contains a mixing zone laterally on the shaft for the separate feed of fuel and pulverized raw material used in the manufacture of cement. This mixture of fuel and raw material is then brought into contact with an upwardly directed stream of oxygen-containing gas received from a rotary kiln. In this type of arrangement, it is difficult to achieve a uniform mixture in the feed pipe and such a mixture can only take place with the aid of mechanical mixers. A further disadvantage of the mixing of fuel and pulverized raw material before they are directed into the stream of gas is that undesirable chemical reactions result between the fuel and the alkali-containing or sulfer-containing raw material which are detrimental to the entire calcining process.

In German Laid Open Specification No. 2,324,519 there is described another type of preheating arrangment utilizing a combustion zone between the preheater and the rotary kiln together with a fuel feed conduit in such a way that the fuel feed conduit is covered by the stream of material being introduced. In this arrangement, it is not possible to adjust the distribution of the quantities of material being introduced so that at predetermined points in the combustion zone, the concentration of raw material is so great that poor combustion or calcining conditions prevail. At other points, the concentration of raw material is relatively low so that at these points the particles reach especially high temperature peaks, with the consequence of over-calcination of the particles of material. The resulting coarsening of the grain and incipient melting appreciably impairs the flow capacity of the raw material and leads to disturbances in the entire installation.

German Laid Open Specification No. 2,365,653 describes an apparatus for the heat treatment of finely grained material with a preheating shaft in which exhaust gases from a rotary kiln flow. An additional combustion zone is provided through which the material is passed twice, once in a downward direction and upwards in the other. In order to achieve this result, the gas velocity must not be too great. Normally, the velocity of the combustion zone is not in excess of about 7 meters per second. This is typical for hot gas velocities currently used, in which the velocity is on the order of 7 to 20 meters per second. A uniform mixture of fuel and material in the preheating shaft and, therefore, a uniform heat treatment of the material is, however, not achieved as in the combustion zone the gases rising up cannot break up the clusters of material and the fuel gives off heat to the outer particles of the materials in the clusters, so that individual particles may be heated too high and others may be heated too little. In addition, such an installation provides undesirably high exhaust gas temperatures as the quantity of fuel theoretically adjusted to the quantity of the raw material cannot give off heat efficiently to the particles of pulverized raw material and the stream of hot gas is heated undesirably high.

SUMMARY OF THE INVENTION

The present invention is directed to an improvement of the type of processes described, namely, mixing fuel with pulverized raw material for use in the manufacture of cement, together with oxygen-containing gases so completely with each other that the individual particles of fuel are so intimately associated with individual particles of raw material that upon subsequent calcination, there is a uniform transfer of heat to the raw material.

One of the features of the present invention is an increase in the linear velocity of the hot stream of gas at the time of introduction of the pulverulent material and/or fuel and/or combustion air to a value of 25 to 40 meters per second. It has been found that through this velocity control, a substantially better mixture of fuel, pulverized raw material and oxygen required for calcination takes place so that the individual particles of fuel can be contacted with particles of the raw material to cause an optimal heat transfer from the oxidizing fuel to the particles of raw material. In this way, partial excess calcination of the pulverized raw material and the consequences resulting therefrom are completely prevented, as, for example, the production of molten masses or a caking together with the particles of material. The hot gases leaving the furnace are at high speeds of 25 to 40 meters per second and become turbulent in the gas-conducting exhaust gas pipe between the sintering furnace and the preheater so that the pulverized raw material introduced into the stream of gas is immediately dispersed without any cluster formation and is picked up immediately by the stream of gas. The fuel introduced into the high velocity, highly turbulent gas stream is likewise immediately finely distributed and made turbulent by the turbulent flow of the hot gases so that the individual particles of fuel encounter individual particles of raw pulverized material to cause optimal heat transfer conditions.

In a preferred form of the invention, the high speed zone of the gas stream begins approximately in the plane of the material supply and extends the full extent of the burning zone of the fuel supplied in the calcination step. The turbulent hot gas is thereby maintained over a very long physical extent, thereby insuring that the finely dispersed particles of fuel and the particles of pulverized raw material come into contact with one another over a substantial period of time. It also insures that at the end of the burn-out portion, particles may react with the oxygen of the hot gas. With this system, all of the fuel introduced into the separate combustion step is reliably oxidized and its heat may still be given off within the burn-out portion for the calcination of pulverized raw material. The use of fuel for the separate calcination process is accordingly decreased, and the losses of exhaust gas are maintained low so that the heat efficiency of the entire installation is improved.

In a further preferred embodiment of the invention, the material is introduced into the stream of gas in a substantially different direction from the direction of gas flow, preferably at an angle of 90° to 180° to the direction of the stream of gas. By this means, the fine dispersion of the pulverized raw material in the turbulent stream of gas is further improved, particularly when the pulverized raw material is introduced into the stream of gas with an initial velocity, so that upon the pulverized raw material meeting the turbulent stream of gas, the pulverized raw material is shredded apart promptly or in sudden bursts, and is dispersed in the stream of gas. Also by this means, the pulverized raw material passes through the stream of gas uniformly deeply and is immediately uniformly distributed over the cross-section of the exhaust gas pipe which directs the stream of gas.

In another preferred form of the invention, the stream of hot gas, together with the oxygen required for the separate pre-calcination process is drawn directly out of the sintering furnace. Consequently, in a simple manner without the additional expenditure for apparatus, oxygen is introduced into the pre-calcination step resulting in an exothermic high temperature zone in the sintering furnace, thereby relieving the rotary kiln and increasing the life of the refractory lining of the furnace. Consequently, the sintering temperature in the furnace does not drop below the threshold temperature required for complete sintering.

Another embodiment of the invention resides in providing the oxygen necessary for the pre-calcination process in an area of the high speed gas stream separately from the hot gases and the fuel. In a preferred form of the invention, the combustion air required for the pre-calcination process is taken from a cooler connected in series with the calcining furnace. Consequently, the rotary kiln may be made smaller or more compact but nevertheless it insures that the fine pulverized raw material entering the furnace is not carried by the stream of gas back into the preheater.

BRIEF DESCRIPTION OF THE DRAWINGS

The single FIGURE in the drawing partly in elevation and partly in cross-section illustrates an apparatus which can be used in the practice of the present invention.

DESCRIPTION OF THE PREFERRED EMBODIMENTS

The embodiment disclosed in the drawing includes a rotary kiln 1 whose inlet end is shown in reduced proportions, the inlet including an inlet chamber 2 into which a conduit 3 feeds particulate material from a lowermost cyclone separator 4 of a suspension gas heat exchanger system. Above the cyclone separator 4 there is disposed a gas discharge conduit 5 which feeds the next higher cyclone separator 6 of the preheater. An exhaust gas conduit 7 having a substantially vertical axis extends between the inlet chamber 2 of the rotary kiln 1 and the preheating device consisting of the several cyclone separators for preheating pulverized raw material to be used in the manufacture of cement. A material supply conduit 8 discharges material from the cyclone separator 6 into the exhaust gas conduit 7. A fuel feed device 9 also discharges pulverized fuel into the exhaust conduit 7. The fuel feed or supply device may consist of one or more nozzles arranged in the area of the wall of the exhaust conduit 7, the nozzles being arranged in the vicinity of and preferably above the mouth of the material feed conduit 8. Below the charging point of the material supply conduit 8 there is provided a baffle or deflector apparatus 10 for the material to be treated, including an adjustable baffle plate 11 which extends perpendicular to the direction of the rising stream of gas into the exhaust gas conduit 7. At the level of the inlet point of the material supply conduit 8, an air conduit 12 discharges an oxygen containing gas. The air conduit 12 is connected to a cooler of the furnace installation which is not shown in greater detail and supplies the oxygen required for the pre-calcination step.

In operation, the hot gas issuing from the inlet chamber 2 of the rotay kiln 1 flows into the gas conduit 7 with a velocity of about 25 to 40 meters per second to the lowermost cyclone separator 4 of the heat exchanger. Within the exhaust gas conduit 7, there exists a strongly turbulent condition. Into the turbulent hot gas stream there is conveyed preheated pulverized raw material from the cyclone separator 6 of the heat exchanger through the material supply conduit 8, preferably with appreciable initial velocity into the exhaust gas conduit 7 and onto the deflecting apparatus 10 in such a manner that the closed stream of pulverized raw material is split by the adjustably positioned deflecting plate 11 and is distributed far into the exhaust gas conduit 7. In the exhaust gas conduit 7, this pulverized raw material meets the strongly turbulent stream of gas and is immediately dispersed into the stream uniformly and immediately carried off by the stream of gas.

The oxygen-containing gas stream introduced substantially at the level at which the material supply conduit 8 extends into the exhaust gas conduit 7 is immediately put into a whirling motion by the turbulent hot stream of exhaust gas so that an ideal intermixture of finely dispersed particles or pulverized raw material results and, enriched with oxygen, rises turbulently in the exhaust gas conduit 7 where it comes in contact with the finely divided particles of fuel introduced through the fuel feed 9 whereupon the particles of fuel because of their intimate and frequent contact with the particles of pulverized raw material surround the same uniformly. Because of the intensive whirling action in the oxygen-containing stream of gas, the fuel particles completely give off their heat to the calcination of the particles of pulverized raw material.

The turbulent stream of gas begins approximately in the plane of the material supply and it is at least as long as the burning zone of the supplied fuels. Thus a predetermined degree of calcination can be achieved and it can be expected that fuel introduced at the end of the burning zone has completely given off its heat energy to the particles of pulverized raw material and not to the stream of gas. The at least partially calcined particles of pulverized raw material are separated in the cyclone separator 4 and conveyed from there through the conduit 3 as pulverized raw material into the rotary kiln 1. The hot gases conveyed out of the cyclone separator 4 through the gas conduit 5 and into the cyclone separator 6 disposed at a higher elevation are utilized further for the heating of the pulverized raw material which is conveyed in countercurrent relation into the upper cyclone stages of the heat exchanger.

The method of the present invention was tested in two different installations for the production of cement. In installation A, a pre-calcination zone was provided in the exhaust gas conduit leading from the rotary kiln furnace to the cyclone heat exchanger. A preheated pulverized raw material to be used in the manufacture of cement was conveyed out of the heat exchanger and into the pre-calcination zone. About 20% of the quantity of fuel required for the entire production process was sprayed into the pre-calcination zone to fuel supply devices. The speed of the rising stream of hot gas in this pre-calcining step was adjusted to 15 meters per second. It was determined that the exhaust gases issuing out of the heat exchanger because of the insufficient heat transfer of fuel to particles of pulverized raw material had an exhaust gas temperature higher by approximately 20° C. than under normal conditions, that is, without the pre-calcination zone being used.

In production installation B, with the same quantity of fuel fired in the pre-calcination step, however, and the speed of gas flow being adjusted to approximately 30 meters per second, the exhaust gas temperature was not higher compared with operation without the pre-calcining zone. This could be attributed to the fact that the fuel sprayed in with the separate calcining step gives off its heat energy because of optimal intermixture with the particles of pulverized raw material and the oxygen required for the calcination completely to the raw pulverized material, and no undesired heating of the hot exhaust gases took place.

The utilization of the method according to the present invention is not limited solely to the embodiment shown by way of example, but it may also be utilized with any pre-calcination device which is provided between a sintering furnace and a preheater of a calcination installation for finely grained material.

It will be evident that various modifications can be made to the described embodiments without departing from the scope of the present invention.

We claim as our invention:

1. A method for the thermal treatment of pulverulent material in which said material is preheated and finely calcined in a final calcination zone, the improvement which comprises pre-calcining said pulverulent material in a highly turbulent gaseous stream containing combustible fuel in a pre-calcination zone prior to final calcination, the linear velocity of said gaseous stream upon contacting said pulverulent material being in the range of 25 to 40 meters per second and the turbulence of said gas stream extending at least as far as the portion of said pre-calcination zone in which said fuel is burned.

2. A method according to claim 1 in which said pulverulent material is injected into said turbulent gaseous stream at an angle of from 90° to 180° to the flow direction of said stream.

3. A method according to claim 1 in which said turbulent gaseous stream together with the oxygen required for pre-calcination is drawn directly from said calcination zone.

4. A method according to claim 3 in which said oxygen and said turbulent stream are supplied separately to said pre-calcination zone.

* * * * *